Dec. 16, 1958  J. H. STAIB ET AL  2,864,864
KETONE SYNTHESIS
Filed Aug. 27, 1954
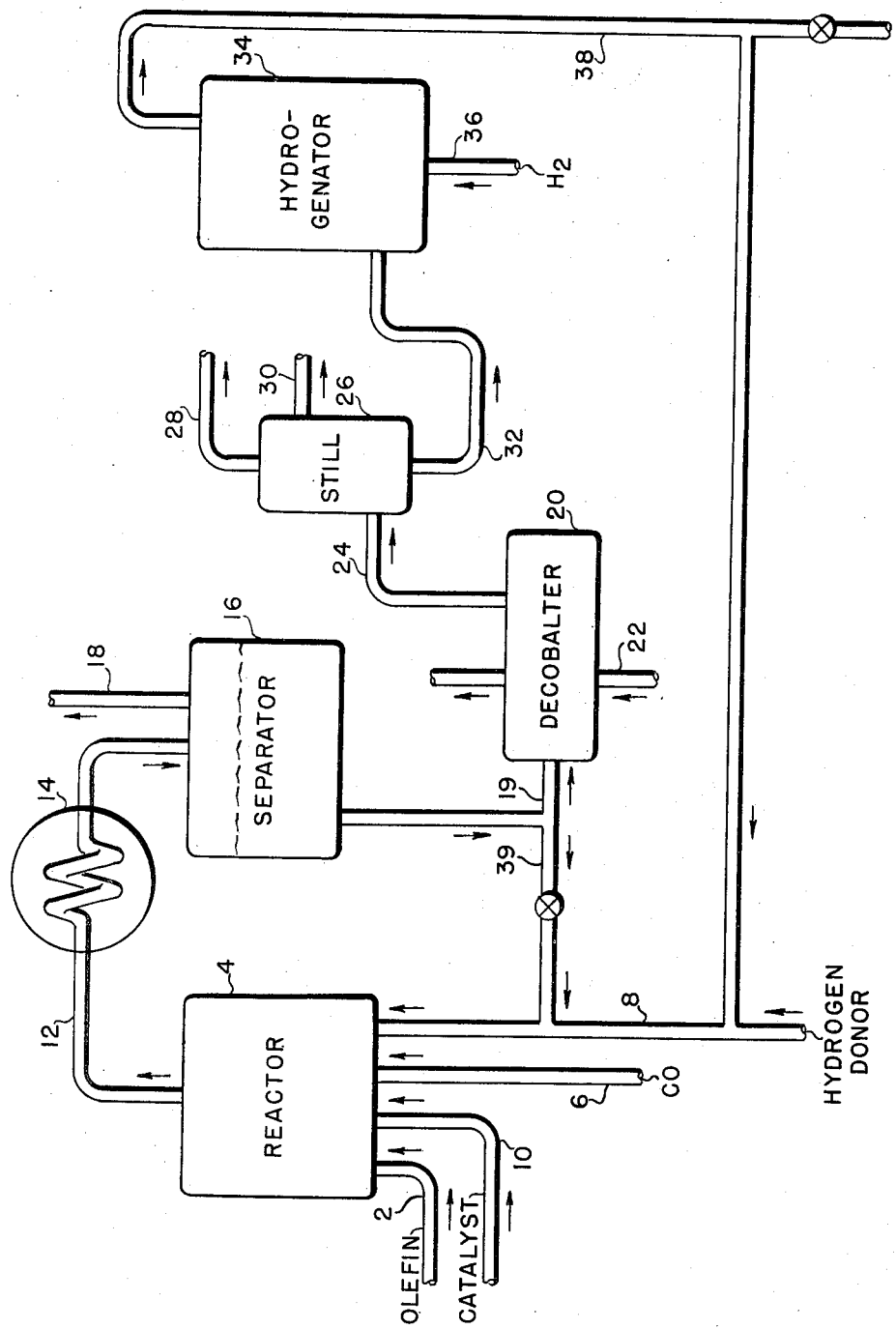
Inventors: John H. Staib
Walter R. F. Guyer
Ober C. Slotterbeck
By   *Richard H. Nagel*  Attorney

2,864,864
KETONE SYNTHESIS

John H. Staib, Plainfield, Walter R. F. Guyer, Short Hills, and Ober C. Slotterbeck, Clark, N. J., assignors to Esso Research and Engineering Company, a corporation of Delaware Application August 27, 1954, Serial No. 452,687

7 Claims. (Cl. 260—597)

The present invention relates to the preparation of oxygenated organic compounds from olefins. More particularly, the present invention relates to the synthesis of ketones by the reaction between organic compounds containing olefinic unsaturation, carbon monoxide, a carbonylation catalyst, and certain cyclic organic compounds.

Ketones are normally prepared commercially by dehydrogenation of secondary alcohols at elevated temperatures over solid catalysts such as copper, zinc oxide, and the like. This process has several drawbacks, including the formation of olefins and the unavailability of the necessary secondary alcohol to prepare the desired ketone.

It is an important object of the present invention to provide a novel and inexpensive process for the preparation of ketones from readily available sources. A still further object of the present invention is to prepare ketones in the presence of a homogeneous catalyst system wherein the catalyst is dissolved in the reactant stream.

Other and further objects and advantages of the invention will appear hereinafter.

In accordance with the present invention, olefinic hydrocarbons are reacted with carbon monoxide in the presence of a cobalt catalyst at temperatures of at least 250° F. and pressures of at least 1500 p. s. i. g. to produce ketones having one more than twice the number of carbon atoms of the original olefin. A necessary reactant, furthermore, is a hydrocarbon capable of acting as a hydrogen donor. Such reactants are isoparaffins; certain substituted, multiple ring, or partially hydrogenated multiple ring aromatic hydrocarbons; and naphthenes. Certain other aromatic hydrocarbons with hydrocarbonaceous substituents, such as toluene, xylenes and ethyl benzene, may require the further addition of small amounts of heterogeneous catalysts, such as nickel and copper.

The synthesis of aldehydes from olefins, carbon monoxide, and hydrogen in the presence of cobalt catalysts is well known. This has been carried out at 150–450° F. and pressures of 100–300 atmospheres and usually with a synthesis gas containing a mol ratio of $H_2/CO$ of 1/1. Almost all types of organic compounds having olefinic unsaturation were found to be amenable to this process to a greater or less extent. Suitable as catalyst were most forms of cobalt, either as solid or in a form soluble in the olefinic feed stock.

It has been observed that when this reaction is carried out at high temperatures, particularly above about 400° F., and when ethylene is employed as the olefin feed, a certain amount of ketonic material, such as diethyl ketone, is formed as a secondary reaction product. This phenomenon is not observed with other olefins. However, at these elevated temperatures cobalt carbonyl, which is the carbonylation catalyst, decomposes rapidly to form metallic cobalt, and the hydrogen present hydrogenates a substantial part of the olefin as well as the aldehyde or ketone formed. At the lower temperatures wherein cobalt carbonyl is stable, little if any diethyl ketone is formed from ethylene, and none from higher olefins.

It has been found surprisingly that when molecular hydrogen is replaced by a hydrocarbon hydrogen donor system, high selectivity to ketones is obtained at temperatures which, when molecular hydrogen is present in the reaction system, results in the substantial formation of aldehydes and no ketones.

In accordance with the present invention which is illustrated in the attached drawing, an unsaturated compound, such as ethylene, propylene, butylenes, amylenes, $C_7$–$C_{12}$ straight or branch-chained olefins, or substantially any carbon compound having olefinic unsaturation is passed to reaction zone 4 through line 2. If desired, the olefin may be dissolved in a solvent which may either be inert, such as, for instance, n-hexane, or it may comprise at least in part either the hydrocarbonaceous hydrogen donor or liquid recycle through line 39. Inert solvents may be the paraffinic and aromatic hydrocarbons such as hexane, heptane, cyclohexane, toluene, benzene, xylenes, and polar compounds such as ethers. These materials are not normally hydrogen donors. As will be pointed out subsequently, however, some of these liquids may be employed as hydrogen donors upon the addition of small amounts of certain metal dehydrogenation catalysts, such as copper, nickel, and some metal oxides, such as chromia.

Also passed into reactor 4 is carbon monoxide, introduced through line 6, and the hydrogen donor liquid through line 8. Tetralin (1,2,3,4-tetrahydronaphthalene), and hydrogenated thermal tar are particularly suitable, for these require no other catalyst. Also suitable are methyl cyclohexane and isoparaffins such as isopentane, but in these cases it is advantageous to add 0.5 to 5% of a dehydrogenation catalyst to the reaction zone. Molecular hydrogen is excluded in all cases.

As carbonylation catalyst there may be added a cobalt salt, preferably one soluble in the olefin feed. Suitable are cobalt oleate, naphthenate, cobalt carbonyl, etc. If desired, however, oil insoluble forms of cobalt, aqueous solutions of cobalt salts, such as acetate and slurries of cobalt oxide, or metal may be employed. The catalyst is injected through line 10. About 0.1–0.3% cobalt based on olefin feed is employed.

Within reactor 4, a temperature of at least 250° F. preferably 300 to 400° F., and a pressure of at least 1500 p. s. i. g., preferably 3000 to 5000 p. s. i. g., is maintained. The rate of flow of gas and olefins is so regulated that the desired conversion level of olefin is obtained. These conditions include an olefin fresh feed rate of about 0.1 to 10 v./v./hr., a CO feed rate of 1000 to 4000 cubic feet/barrel of olefin, a ratio of 0.25 to 2.25 moles of hydrogen donor per mol of olefin, and a residence period of about 0.1 to 10 hours.

Liquid reaction product is drawn overhead through line 12 and is passed through cooler 14 to high pressure separator 16, from which unreacted gases are withdrawn overhead through line 18. Reaction product containing a large concentration of cobalt carbonyl is passed via line 19 to decobalter 20 where, by injection of hot water, steam, inert gases, dilute acids or the like, through line 22, the cobalt carbonyl is decomposed to CO and oil-insoluble forms of cobalt, all in a manner known per se. A portion of the reaction product withdrawn from separator 16 may also be recycled to reactor 4 via line 39 as mentioned before.

Reaction product comprising ketones, unreacted hydrogen donor, and unsaturated compounds such as aromatics corresponding to the hydrogen donor after loss of hydrogen, is withdrawn through line 24 and passed to distillation zone 26. Thus if Tetralin is employed as the hydrogen donor, napthalene would be the corresponding unsaturated compound.

In distillation zone 26, it is preferable to regulate conditions such that the ketone and any side reaction product, such as aldehyde, are withdrawn together, and also such that the hydrogen donor and its unsaturated conversion product are withdrawn as a single stream. If an inert solvent is employed, this is similarly separated, all in a manner known to those skilled in the art. Thus when ethylene is employed as the olefin, hexane as the solvent, and Tetralin as the hydrogen donor, the solvent is recovered through line 28 as a heads cut, diethyl ketone through line 30 as a side stream, and naphthalene and unreacted Tetralin as a bottoms product through line 32. The diethyl ketone may be freed from secondary reaction products by a subsequent distillation step (not shown). The Tetralin naphthalene fraction is preferably passed to a hydrogenation zone 34 where, in the presence of $H_2$ and known hydrogenation catalyst, such as nickel, copper chromite, etc., the mixture is reconverted to the Tetralin and recycled to reactor 4 via lines 38 and 8.

The process of the present invention may be further illustrated by the following specific examples. In Table 1, there are collected data comparing yields and selectivities of diethyl ketone from ethylene prepared by reaction: (1) of $H_2$, CO and a cobalt catalyst (runs A and B); (2) of CO, Tetralin and a cobalt catalyst (runs C–G; and (3) CO, methylcyclohexane, a dehydrogenation catalyst and a cobalt catalyst (runs H and I).

bon monoxide and Tetralin under the following conditions:

500 cc. hexane
400 cc. Tetralin
100 cc. cobalt oleate (hexane solution containing 4 wt. percent cobalt)
2.87 moles propylene
10.9 moles CO The reaction was carried out at 150° C. (302° F.) for 24 hours, at 3500 p. s. i. g. A total of 1012 cc. of crude was recovered which on distillation corresponded to a conversion of 14.6%. The selectively of the reaction is indicated as follows:

| | Percent |
|---|---|
| To butyraldehyde | 58.9 |
| To 4-heptanone | 34.2 |
| To unsaturated $C_8$ aldehyde | 6.9 |

The reaction product, 4-heptanone, was identified by converting it to the 2,4 dinitro-phenylhydrazone derivative which was found to have a melting point of 75.8° C. The corresponding 2,4 dinitro-phenylhydrazone derivative prepared from a sample of pure 4-heptanone melted at 75.5° C. A mixed melting point showed no depression.

TABLE 1
*Diethyl ketone synthesis*

| Run No. | A | B | C | D | E | F | G | H | I |
|---|---|---|---|---|---|---|---|---|---|
| Charge: | | | | | | | | | |
| Ethylene, Moles | 2.48 | 2.50 | 2.55 | 2.55 | 2.76 | 2.44 | 2.87 | 2.44 | 2.54 |
| Diluent, cc. | a 1,000 | a 1,000 | a 500 | a 500 | a 700 | a 617 | a 150 | | a 300 |
| $H_2$ Donor, cc. | | | b 500 | b 500 | b 150 | b 83 | b 150 | c 700 | c 300 |
| Cobalt Oleate,[1] cc. | 200 | 250 | 150 | 150 | 150 | 100 | 100 | 100 | 100 |
| Copper, Grams | | | | | | | | 10 | |
| UOP Nickel,[2] cc. | | | | | | | | | 25 |
| $H_2$, Mols | 1.49 | 2.5 | 0 | 0 | 0 | 0 | 0 | 0 | 0 |
| CO, Mols | 5.95 | 5.0 | 10.7 | 10.7 | 11.5 | 12.7 | 15.0 | 12.7 | 13.9 |
| Conditions: | | | | | | | | | |
| Temperature, °C | 175 | 175 | 200 | 150 | 175 | 175 | 200 | 185–200 | 200 |
| Pressure, p. s. i. g. | 3,500 | 3,500 | 3,500 | 3,500 | 3,500 | 3,500 | 3,500 | 3,700 | 3,500 |
| Hours | 19 | 20 | 4½ | 19 | 20¾ | 22 | 18¾ | 22 | 18½ |
| Product, Mole Percent: | | | | | | | | | |
| Conversion | 81.8 | 76.5 | 86.0 | 25.2 | 24.5 | 15.0 | 49.2 | 21.2 | 23.1 |
| Yield: | | | | | | | | | |
| $C_3$ Aldehyde | 1.6 | 8.9 | 35.5 | 7.1 | 2.3 | 2.7 | 6.5 | 1.0 | 1.0 |
| Diethyl Ketone | 0 | 0 | 0 | 10.7 | 8.2 | 10.7 | 20.4 | 19.2 | 21.6 |
| $C_4$ Unsat. Aldehyde | 80.2 | 67.6 | 25.1 | 7.4 | 14.0 | 1.6 | 22.3 | 1.0 | 0.5 |
| $C_4$ Satd. Aldehyde | | | 25.4 | | | | | | |
| Selectivity: | | | | | | | | | |
| $C_3$ Aldehyde | 2.0 | 11.6 | 41.3 | 28.2 | 9.4 | 18.0 | 13.2 | 4.7 | 4.3 |
| Diethyl Ketone | 0 | 0 | 0 | 42.5 | 33.5 | 71.4 | 41.5 | 90.5 | 93.5 |
| $C_4$ Unsatd. Aldehyde | 98.0 | 88.4 | 29.2 | 29.3 | 57.1 | 10.6 | 45.3 | 4.8 | 2.2 |
| $C_4$ Satd. Aldehyde | | | 29.5 | | | | | | | a Hexane.   b Tetralin.   c Methyl cyclohexane.
[1] Hexane solution containing 4 wt. percent cobalt.
[2] Nickel precipitated on kieselguhr.

These data show that at moderate temperatures of about 175° C. (347° F.), no diethyl ketone is formed in the presence of molecular hydrogen (A and B). Small amounts of 3–4% were formed under similar reaction conditions at higher temperatures of 250° C. (482° F.). At this temperature, cobalt carbonyl, the active catalyst, is rapidly decomposed.

The data further show that good yields and high ketone selectivieis are obtained when, instead of employing molecular hydrogen, a hydrogen donor hydrocarbonaceous reactant is employed. In the case of Tetralin, no catalyst other than cobalt was required. Using methylcyclohexane, it was expedient to use a metal catalyst, such as Cu or Ni. With Tetralin, the cobalt hydrocarbonyl apparently acted as a hydrogen transfer agent.

In another example, propylene was reacted with carbon monoxide and Tetralin under the following conditions:

The process of the present invention may be subject to many variations within the skill of those adept in the art.

What is claimed is:

1. The process for converting an olefin of 2 to 12 carbon atoms into a ketone having one more than twice the number of carbon atoms than said olefin, which comprises passing to a reaction zone said olefin of 2 to 12 carbon atoms, carbon monoxide, and as a hydrogen donor a hydrogenated multiple ring aromatic, maintaining a mol ratio of said hydrogenated aromatic to olefin of up to 2.25, maintaining a cobalt catalyst in said zone, maintaining a temperature of from about 300–400° F. and a pressure of from about 3000–5000 p. s. i. g. in said zone, and recovering said ketone and dehydrogenated hydrogen donor.

2. The process of claim 1 wherein said dehydrogenated donor is hydrogenated to regenerate said hydrogen donor.

3. The process of claim 1 wherein said olefin is propylene.

4. The process of claim 1 wherein said hydrogen donor is Tetralin.

5. The process according to claim 1 wherein said hydrogen donor is hydrogenated thermal tar.

6. A process for making 4-heptanone which comprises passing to a reaction zone propylene, carbon monoxide at a rate of 1000 to 4000 cubic feet per barrel of propylene, Tetralin at a rate of 0.25 to 2.25 moles per mole of propylene, and a cobalt carbonylation catalyst at a rate of 0.1 to 0.3% cobalt based on propylene feed, maintaining a temperature of about 150° C. and a pressure of about 3500 p. s. i. g. in said reaction zone, and recovering the heptanone from the resulting reaction product.

7. A process according to claim 6 wherein the catalyst is a solution of cobalt oleate in hexane.

References Cited in the file of this patent

UNITED STATES PATENTS

| 2,448,386 | Gresham et al. | Aug. 31, 1948 |
| 2,526,742 | Gresham et al. | Oct. 24, 1950 |

OTHER REFERENCES

Ellis: Hydrogenation of Organic Substances, 3rd ed., pp. 873–4 (1930).

Natta et al.: JACS, 74 (1952), p. 4496.